US012682382B2

(12) United States Patent
Mukherjee et al.

(10) Patent No.: US 12,682,382 B2
(45) Date of Patent: Jul. 14, 2026

(54) PRODUCT DESIGN GENERATOR

(71) Applicant: International Business Machines Corporation, Armonk, NY (US)

(72) Inventors: Sumanta Mukherjee, Bangalore (IN); Subarna Roy, Bengaluru (IN); Krishnasuri Narayanam, Bangalore (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 18/222,594

(22) Filed: Jul. 17, 2023

(65) Prior Publication Data

US 2025/0029160 A1     Jan. 23, 2025

(51) Int. Cl.
| | |
|---|---|
| *G06Q 30/0601* | (2023.01) |
| *G06N 3/0475* | (2023.01) |
| *G06N 3/094* | (2023.01) |
| *G06Q 30/0202* | (2023.01) |

(52) U.S. Cl.
CPC ....... *G06Q 30/0621* (2013.01); *G06N 3/0475* (2023.01); *G06N 3/094* (2023.01); *G06Q 30/0202* (2013.01)

(58) Field of Classification Search
None
See application file for complete search history.

(56) References Cited

U.S. PATENT DOCUMENTS

| | | | | |
|---|---|---|---|---|
| 9,949,519 | B2 | 4/2018 | Koh | |
| 10,963,744 | B2 * | 3/2021 | Sewak | G06V 10/82 |
| 2018/0349795 | A1 * | 12/2018 | Boyle | G06Q 10/067 |
| 2019/0164061 | A1 * | 5/2019 | Freed | G06N 20/00 |
| 2020/0005087 | A1 * | 1/2020 | Sewak | G06F 3/0481 |
| 2022/0058526 | A1 | 2/2022 | Boyle et al. | |
| 2022/0108195 | A1 * | 4/2022 | Kehler | G06N 3/047 |
| 2022/0398365 | A1 * | 12/2022 | Kumar | G06Q 50/04 |

(Continued)

OTHER PUBLICATIONS

Yang et al., Emotionally Intelligent Fashion Design Using CNN and GAN, Jan. 7, 2021.

(Continued)

*Primary Examiner* — Chesiree A Walton
(74) *Attorney, Agent, or Firm* — Kristofer Haggerty

(57) ABSTRACT

An embodiment establishes a product design database based at least in part on product design data received from a product image repository, wherein the product design data is representative of a plurality of product designs. The embodiment ranks each product design based on a ranking metric derived from market data corresponding to existing retail products. The embodiment constructs a product design ranking based on a relative ranking between each of the product designs that have been ranked. The embodiment generates a new product design using a machine learning model based on the plurality of product designs and the product design ranking. The embodiment evaluates whether the new product design satisfies a design constraint. The embodiment, upon an evaluation that the new product design satisfies the design constraint, stores the new product design in the product design database. The embodiment displays the new product design via an interface.

17 Claims, 9 Drawing Sheets

(56)　　　　　References Cited

U.S. PATENT DOCUMENTS

| | | | |
|---|---|---|---|
| 2024/0053964 A1* | 2/2024 | Chintakunta | .......... G06N 3/048 |
| 2025/0095008 A1* | 3/2025 | Moghaddam | .......... G06N 3/094 |

OTHER PUBLICATIONS

Yan et al., Toward Intelligent Design: An AI-based Fashion Designer Using Generative Adversarial Networks Aided by Sketch and Rendering Generators, Jan. 25, 2022.

Li et al., A Hierarchical Innovation-Related Crowdsourcing Decision in Fast Fashion Industry, Apr. 13, 2020.

Jo et al., Development of Fashion Product Retrieval and Recommendations Model Based on Deep Learning, Mar. 19, 2020.

Masukawa et al., GAN-based Detailed Clothing Generation System, Feb. 17, 2023.

Bettaney et al., Fashion Outfit Generation for E-commerce, SIGIR 2019 eCom, Jul. 2019.

Cheng, DeepStyle (Part 1): Using State-of-the-Art Deep Learning to Generate Realistic High Fashion Clothing and Style, Jul. 26, 2020.

Liu et al., DeepStyle: Learning User Preferences for Visual Recommendation, SIGIR '17, Aug. 7-11, 2017.

Otsuka et al., A Deep Choice Model, Proceedings of the Thirtieth AAAI Conference on Artificial Intelligence (AAAI-16), Feb. 21, 2016.

Sapna et al., Recommendence and Fashionsence: Online Fashion Advisor for Offline Experience, CODS-COMAD '19: Proceedings of the ACM India Joint International Conference on Data Science and Management of Data, pp. 256-259, Jan. 3, 2019.

Jaiswal et al., Product Review Image Ranking for Fashion E-commerce, SIGIR eCom'22, Jul. 15, 2022.

Gautam, Artificial Intelligence as a part of fashion product design, Mar. 23, 2023, https://timesofindia.indiatimes.com/blogs/voices/artificial-intelligence-as-a-part-of-fashion-product-design/#:~:text=AI%20can%20be%20used%20to%20generate%20new%20and,concepts%20that%20are%20likely%20to%20resonate%20with%20customers.

Indiaai, Myntra's new AI-powered fashion platform, Jan. 22, 2020, https://indiaai.gov.in/case-study/myntra-s-new-ai-powered-fashion-platform.

Nazemi et al., Identifying and ranking new product factors of fashion industry (case study Iranian menswear brand), Jun. 2021.

Teicher, In India, bestseller turns to AI to keep stores relevant, Mar. 20, 2019.

Marr, Three AI and Tech trends that will transform the fashion Industry, Mar. 26, 2021.

Datadriveninvestor, AI and Machine learning for Fashion industry—Global trends & benefits, Feb. 3, 2020.

Singh et al., Fashion Retail: Forecasting Demand for New Items, Jun. 27, 2019.

Databricks, Applied Machine Learning for Ranking Products in an Ecommerce Setting, https://www.youtube.com/watch?v=6BGCn3h59nA, 2023.

* cited by examiner

PRODUCT DESIGN GENERATOR

BACKGROUND

The present invention relates generally to image generation. More particularly, the present invention relates to a method, system, and computer program for a product design generator.

Artificial intelligence (AI) technology has evolved significantly over the past few years. Modern AI systems are achieving human level performance on cognitive tasks like generating images, recognizing objects and images, converting speech to text, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Generative Adversarial Network (GAN) is a type of artificial intelligence (AI) model that may be used for generating new data samples that resemble a given training dataset. A GAN generally comprises of two competing neural networks: a generator network, and a discriminator network. The generator network is configured to create synthetic data samples, such as images, audio, text, etc. by learning the underlying patterns and structures from a given training dataset. Further, the generator network may receive random noise as input and generate output that is intended to be similar to the real data. The discriminator network receives both the synthetic data created by the generator and real data samples from the training dataset. The discriminator is configured to distinguish between the real and fake data samples. Accordingly, the discriminator network may be configured as a binary classifier, that may be trained to correctly classify the real data as genuine and the synthetic data as fake. The goal of a GAN is to achieve a point where the generator can generate synthetic data that is indistinguishable from the real data by the discriminator. Once trained, GANs have various applications, including but not limited to, generating realistic images, creating novel artwork, synthesizing speech, and/or enhancing data augmentation techniques.

SUMMARY

The illustrative embodiments provide for a product design generator. An embodiment includes establishing a product design database based at least in part on product design data received from a product image repository, wherein the product design data is representative of a plurality of product designs. The embodiment further includes ranking each product design of the plurality of product designs stored on the product design database based on a ranking metric derived from market data corresponding to existing retail products. The embodiment further includes constructing a product design ranking based on a relative ranking between each of the product designs that have been ranked. The embodiment further includes generating a new product design using a machine learning model based on the plurality of product designs and the product design ranking. The embodiment further includes evaluating whether the new product design satisfies a design constraint. The embodiment further includes, upon an evaluation that the new product design satisfies the design constraint, storing the new product design in the product design database. The embodiment further includes displaying the new product design via an interface.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
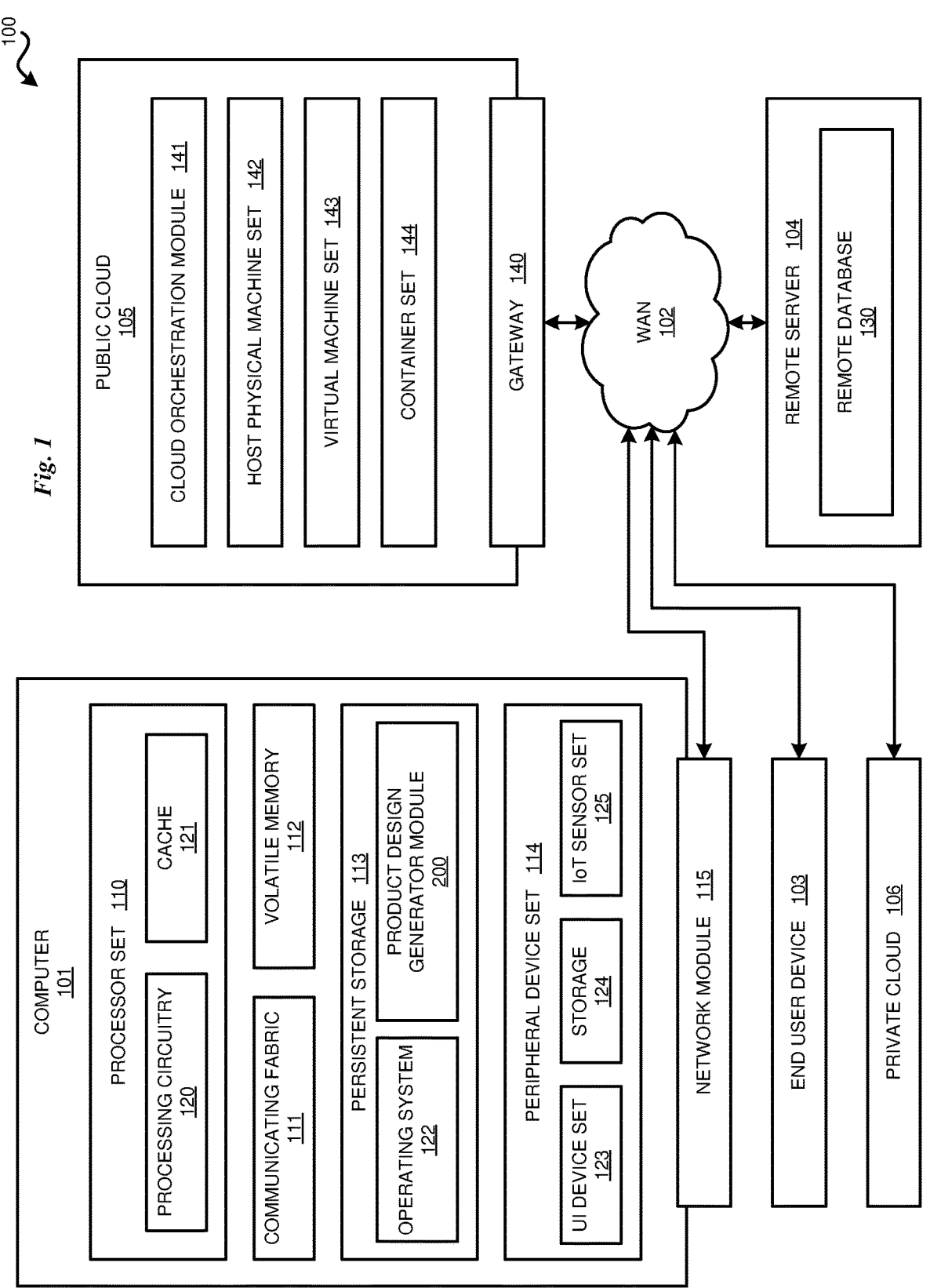
FIG. 1 depicts a block diagram of a computing environment in accordance with an illustrative embodiment.

A number of products and industries have many dynamic aspects. In some industries, product preferences and emerging product trends are dependent on localized preferences. Accordingly, some preferences that influence product designs are dependent on regional preferences and sensitivities that may exist in one region but not another. Further, preferences, trends, favorability, and other product design considerations often exhibit shifting behavior. Location, season, weather, environment, culture, historical precedence, interpersonal influences, and other circumstances are some aspects that bear on product design. The illustrative embodiments recognize that the design of the products must take into consideration these and other aspects. Certain embodiments herein are described with reference to the fashion industry and fashion products without implying any limitation on the applicability of the embodiments to other products and other industries.

The fashion retail industry is an example of an industry that is characteristically highly dynamic for multiple reasons. Trends in the fashion industry and preferences for styles of clothing may be hyper localized. For example, even in the same country, a style of clothing that is popular in one region of a country may be different from a style of clothing in a different region of the country. Further, trends in fashion retail often exhibit shifting behavior. Hyperlocal behaviour within the fashion industry suggests the fashion trends are location driven. On the other hand, shifting trend behaviour suggests that at a given location the fashion trend changes over time. Accordingly, this non-stationary and shifting trend behaviour of consumers demands high rate of new product generation in the fashion retail industry.

New product designs are often interpolations of existing product designs. Accordingly, new product designs are often created based on previous product designs. During the processes of creating new product designs, selecting design concepts is a primary step in the new product design. A collection of design concepts together defines the product design space. Once design concepts are selected, a final product is designed in part by combining concept-motivations obtained from these selected designs. Design concepts are often selected based on a current best-selling product on the market, and design concept selection is often guided by market demand. However, it is contemplated herein that selecting design concepts based on the current best-selling product may not be optimized from a designer perspective, and likewise fails to capture the innovation component of new product design.

Product design technology has evolved to allow creation of future products based on historical market demand for previously existing products. Said technology increases the ability of retailers to produce products that will be purchased by consumers. It is contemplated herein that some systems and/or methods may exist that are aimed towards designing new products to introduce into the market. Accordingly, said systems and/or methods may be utilized to evaluate the importance of various product attributes based on historical purchase behavior and/or survey data. Further, the evaluation results of said systems and/or methods may be analyzed to introduce future product versions into the market. Further, some of these systems and/or methods may integrate into AI assisted product designer tools that may also aid in the design of new products.

However, there are currently no systems and/or methods that are configured to evaluate features related to visual content and/or style of products. It is contemplated herein that features related to visual content and/or style may be important in the evaluation of a market trend. The currently existing systems and/or methods for product design lack input of important considerations, as discussed herein. For example, the underlying model(s) in currently existing future product version decision systems do not possess an embedded feedback mechanism that may be configured to instantaneously capture the feasibility of the product from the point of view of a designer and/or manufacturer.

Despite the advancement of these currently existing product design technologies, these technologies may still be nonetheless ineffective for producing new product designs.

For example, attribute based discretized product representations are often incapable of capturing subtle visual cues and aesthetics that are important for guiding the market sentiment, and likewise achieving scalability of a product or products. Rather than using discrete attribute space representation, data driven vector embedding derivation for the product images is a more effective representation of the product to carry out product interpolation and new product design.

Further, there is currently there no way to incorporate feedback from a designer and/or manufacturer into a future product design system. There is also currently no holistic system that considers localized style preferences, shifting trend behaviors, market demand, and/or market sentiment towards fashion products.

The present disclosure addresses the deficiencies described above by providing a process (as well as a system, method, computer program, machine-readable medium, etc.) that develops a model that generates an image of a product design. Disclosed embodiments combine a Generative Adversarial Network with reinforcement learning to generate an image of a new product design based in part on a collection of pre-existing product designs, a relative ranking of the pre-existing product designs, and human input.

As used throughout the present disclosure, the term "fashion product" refers to any item and/or article that is designed, produced, and/or marketed for personal adornment or style. A fashion product may include any item that may be worn, carried, or used as an accessory. Examples of fashion products may include, but are not limited to, clothing/garments (e.g., shirts, pants, dresses, etc.), footwear, accessories (e.g., jewelry, bags, hats, scarves, belts, etc.), and home goods (e.g., upholstery, curtains, bedding, pillows, etc.).

As used throughout the present disclosure, the term "fashion collection", (also known as a clothing or apparel collection, or simply "collection" depending on the context) refers to a group of fashion products (e.g., garments, accessories, etc.) created by a designer or fashion brand. Typically, a fashion collection is a curated group of garments and accessories created for a specific season or occasion. Each product within the collection may be designed with a cohesive theme, color palette, fabric selection, design elements, etc. that collectively contribute to a particular aesthetic intended by the designer and/or fashion brand. Further, it is contemplated that the terms "fashion collection", "wardrobe", and "catalogue" may all denote the same meaning and accordingly may be used interchangeably in the present disclosure.

Embodiments have been described herein with reference to fashion products. However, the inclusion of terminology referencing fashion products is not a limiting aspect of the scope of the present disclosure. Embodiments related to the generation of new designs for other types of products are likewise considered. For example, products may also include other types of products in addition to fashion products, including but not limited to, furniture/furnishings (e.g., chairs, sofas, tables, desks, dressers, cabinets, etc.), decorations (e.g., vases, sculptures, ornaments, rugs, etc.), architecture, transportation-related products (e.g., cars, motorcycles, scooters, wheels, body kits, automotive accessories, etc.), packaging (e.g., bottles, jars, cans, cartons, boxes, containers, etc.), and other types of products as well. It is contemplated herein that embodiments include a product design generator that may be used in connection with the generation of any type of product that contains an aesthetic design element. Further, while embodiments have so far been described with reference to physical products, it is contemplated that products likewise include digital products. Examples of digital products may include, but are not limited to, virtual avatars, accessories, assets, and/or any products that may exist in a simulated virtual environment, including the types of products previously described. Further, although embodiments reference a "fashion collection", it is understood that a "collection" may likewise be understood in a broader sense as any grouping of products that are associated with a particular brand or retailer.

As used throughout the present disclosure, the term "evaluator" refers to a person and/or entity that provides feedback for a generated image of a new product design. The evaluator may refer to a designer, a manufacturer, and/or any person associated with of a brand or retailer. An evaluator may likewise include more than one person and/or entity. For example, an evaluator may include a group of people, such as for example, a board of members.

As used throughout the present disclosure, the term "purchaser profile" refers to a profile of a purchaser of a particular products. Accordingly, retailers often maintain profiles of the purchasers of the retailer's products. The purchaser profile may include purchase data obtained from tracking purchaser purchase history, basket analysis, browsing history, and accordingly may reveal purchaser choice interests and product preferences.

As used throughout the present disclosure, the term "consumer data" refers to all personal, behavioral, demographic, geographic, psychographic, and/or financial data that may be related to a consumer of a product. Personal data may include, but is not limited to, a name, an address, a phone number, an email addresses, and/or any other data related to identifying information. Behavioral data may include data related to consumer behavior, preferences, and actions, including but not limited to, browsing history, purchase history, product preferences, online interactions, and/or engagement with a marketing campaign. Geographic data may include data related to a consumer's geographic location, including but not limited to, a consumer's city, state, or country. Geographic data may also include data related to proximity to certain places or geographic areas. Psychographic data refers to data about a consumer's attitudes, beliefs, values, interests, and/or lifestyle choices. Financial data refers to data related to a consumer's financial status, including, but not limited to, income, and expenditure patterns.

As used throughout the present disclosure, the term "social network activity data" refers to data related to any action or actions taken across a social network. Social network activity may include data related to the content a user shares on a social network, including but not limited to, status updates, photos, videos, links, articles, etc. Social network activity may further include data related to a user's engagement with other users/and or media on the social network, including but not limited to, "likes", shares, comments, etc. Social network activity may further include data related to a user's interactions, including but not limited to, a page and/or account a user follows, a group a user joins, and/or a topic the user engages with. Social network activity may further include data related to a user's interactions with advertisements on a social network, including but not limited to, clicks, conversions, and/or ad preferences. Also, social network activity may further include location related data, including but not limited to, a user's location and check-ins. Social network activity data that is received in connection with a specific product may be indicative of the market demand for that specific product.

As used throughout the present disclosure, the terms "point of sales data" or "POS data" refer to direct sales data relating to a product or products. The number of sales for each product may be indicative of the market demand for each product.

Illustrative embodiments include system and methods to train and inference a machine learning model to generate photo-realistic fashion product designs based on an existing product catalogue that considers market sentiment and feedback from a designer as well as a manufacturer, that enables control of the relative frequency of the predicted fashion design type, as well as enables model retraining for adoption in similar environments. Accordingly, said embodiments include a process for providing a data driven interactive expert fashion designer system that includes utilizing designer and/or manufacturer feedback in the new product generation process.

Illustrative embodiments include utilizing visual content in an image dataset for scoring images based on demand for enumerated products represented by images within said dataset. In an embodiment, the image dataset is a crowdsourced product image dataset. In an embodiment, high-scoring product images may be used to generate new product images to represent a new and/or emerging trend.

Illustrated embodiments consider one or more crowdsourced product images for each design type. The images may be represented as vector embeddings using a deep neural network. In the embedding space, the vector cosine distance may represent product similarity. Vector embeddings may be used to carry out product interpolations from existing wardrobe designs and new product designs from domain experts. It is contemplated that vector embedding representation may be more effective compared to attribute based discrete product representation at least in capturing the visual cues and aesthetics important for guiding the market sentiment. Further, designs may be ranked using metrics from one or more data sources, including but not limited to, browsing data, POS data, and social network data. Top K designs may be used in each iteration of the model training. In each iteration, the model is sampled to select at least $\mu$ designs, where $\mu \gg K$. Acceptance rate may be computed as the fraction of designs selected out of total number of designs generated. If the acceptance rate is above an allowed threshold, iteration may be ceased. The selected designs sampled using the model may be part of the training data for the next iteration.

Further, hyper local adjustment and adaptation to shifting trend behavior may be achieved by including a rank guided loss function in the model training. The process considers drift in the market sentiment, by, for example, identifying obsolete product designs and/or identifying designs with increased market demand. Further, the process enables interactive rank update of training data based on designer/manufacturer feedback for model fine-tuning and convergence.

Illustrative embodiments include a product design generator model that is configured to generate an image of a new product design. In an embodiment, the product design generator model includes a plurality of modules that may aid the product design generator model in generating an image of a new design, and/or training the product design generator model to more effectively generate an image of a new design.

In an embodiment, the product design generator includes a Generative Adversarial Network (GAN) trained to generate a new product design. In said embodiment, the GAN may include a generator network module, and a discriminator network module, wherein the generator network module is configured to generate a synthetic image of a product, while the discriminator module is configured to distinguish between a synthetic image of a product and a real image of a product. In an embodiment, the discriminator is a binary classifier configured to classify a real image of a product as "real" and a synthetic image of a product as "fake". The generator network module and the discriminator module may be trained simultaneously to compete against each other, until the discriminator is no longer able to distinguish a real image of a product from a synthetic image of a product.

Illustrative embodiments further include a ranking module that determines a relative ranking for products based on a plurality of ranking metrics. The ranking metrics may be related to market demand for a product or products and/or market sentiment towards a product or products. Further, the plurality of ranking metrics may be derived from a plurality of ranking metric sources, including but not limited to, internet browsing data, social network data, and/or point-of-sale (POS) data. Further, an embodiment includes transforming a product in vector embeddings representing the features of a product and determining a ranking of product features using the ranking module. Further, the ranking module may be used to provide a relative ranking for pre-existing product designs within a given collection of product designs. Accordingly, the ranking module may be used to transform an unordered collection of pre-existing products, to a rank-ordered collection of pre-existing products.

Illustrative embodiments further include a multi-label attribute classifier module that labels attributes of a product. Accordingly, the multi-label attribute classifier module may be used to label any attributes related to a fashion product. An example attribute related to a fashion product may include, but is not limited to, type of garment, type of garment style, type of material, existence of a particular pattern, existence of a particular adornment, etc.

Illustrative embodiments further include training the product design generator model via a reinforcement learning with human feedback (RLHF) technique. RLHF refers to a machine learning technique that combines reinforcement learning and human feedback to train a model. Accordingly, training the product design generator model may include incorporating human feedback during the training process. Further, a human evaluator may rate and/or provide feedback on a generated product design image based on certain criteria, such as, for example, design preference or manufacturing constraints. In an embodiment, the human feedback includes accepting or rejecting a new product design. The feedback may then be used as a reward signal to guide the reinforcement learning algorithm when training the product design generator model. It is contemplated herein that RLHF is especially well suited for image generation of fashion product designs, due to the subjective criteria associated with fashion design. Accordingly, since desired fashion product design may be highly subjective in nature, it may be otherwise challenging to determine an explicit reward function for the generation of a fashion product design image. The RLHF technique incorporated herein addresses the issue of determining whether a new fashion product design constitutes a desired design.

Illustrative embodiments further include iteratively training the product design generator. Accordingly, the training process may include an iterative loop, where the product design generator model generates a set of product design images, and a human evaluator evaluates, e.g., accepts/ rejects, each of the generated product design images. The feedback received from the evaluator may be used to update the model's parameters through a reinforcement learning algorithm. The training process may be repeated until the model's performance improves based on a given criteria, and/or a predetermined exit criteria is met. In an embodiment, the predetermined exit criteria include meeting a predetermined acceptance threshold. The acceptance threshold may be adjustable as a user setting, for example, depending on the application and desired level of detail and precision.

Embodiments of the process disclosed provide a significant improvement to the functioning of the underlying computer technology utilized to perform said process. An improvement herein includes a more efficient utilization of computer resources. Accordingly, the incremental training approach for the training of the model(s) described herein enables a significant reduction on the drain of computer resources that would otherwise result from training the model(s).

Embodiments of the process disclosed provide a significant improvement over previous attempts to recognize important characteristics of products. Accordingly, utilization of a data driven vector embedding derivation for a product image enables a much more precise recognition of important characteristics than previous attempts. Further, it is contemplated that the processes disclosed herein would be impossible to perform by a human mind alone. Accordingly, a human mind alone is incapable of deriving vector embeddings for images. Further, the level of granularity provided by vector embeddings would be impossible to achieve with a human mind alone, and thus the computer technology disclosed herein is necessary to capture subtle visual cues and aesthetics that are important for guiding the market sentiment, that otherwise may be missed.

Embodiments disclosed herein describe the product design generator model as a modified generative adversarial network (GAN); however, use of this example is not intended to be limiting but is instead used for descriptive purposes only. Instead, the product design generator model can include elements of one or more other types of neural networks and/or models, including but not limited to, deep generative neural networks, a generative pre-trained transformer, a variational autoencoder, an autoregressive model, a flow-based model, and/or any other neural network and/or model suitable for image generation.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as product design generator module 200 that generates an image of a new product design based in part on image data representing pre-existing products. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
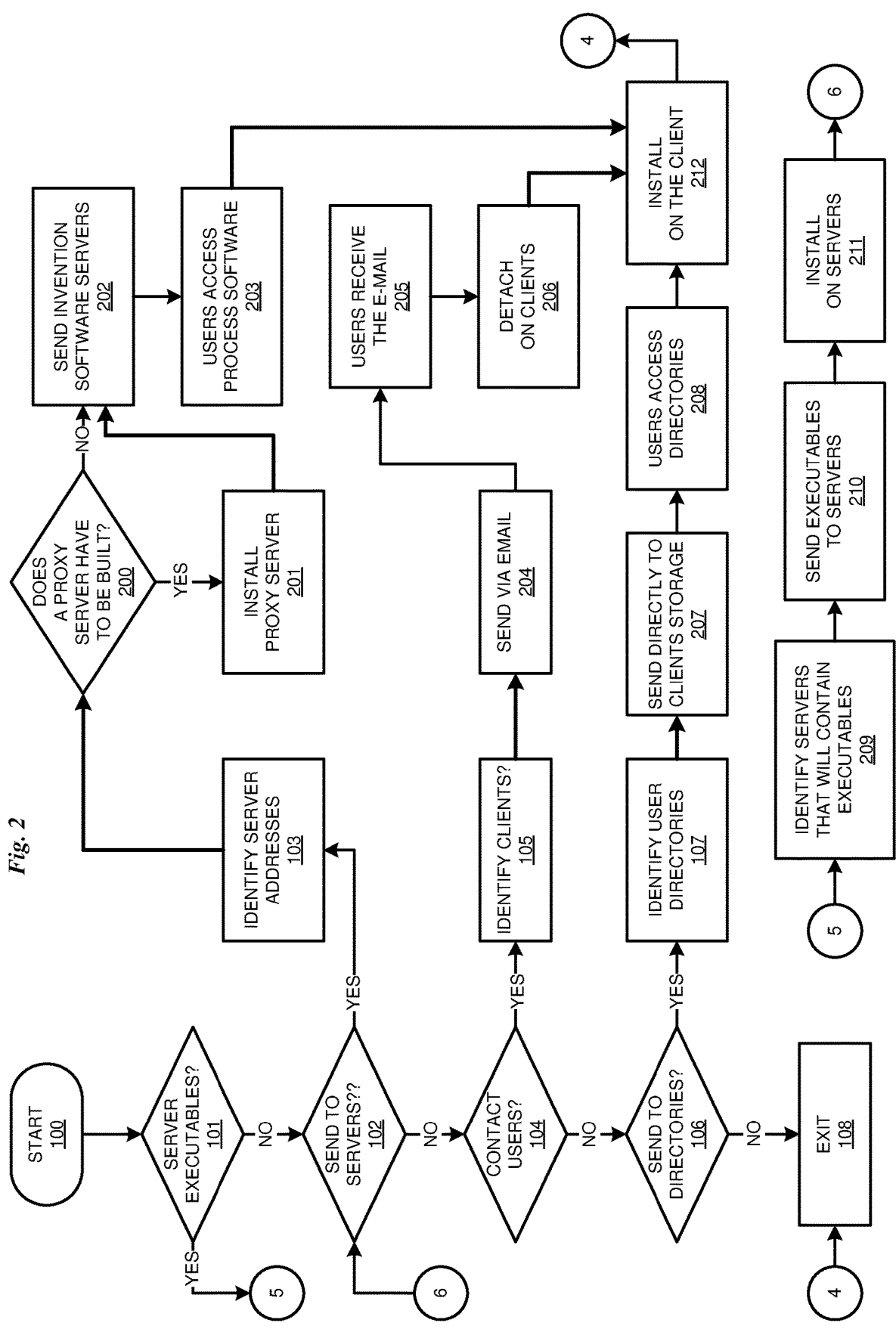
FIG. 2 depicts a flowchart of an example process for deploying product generation software in accordance with an illustrative embodiment.

With reference to FIG. 2, this figure depicts a flowchart illustrating an example process for deploying the product design generation software. While it is understood that the new product generation software may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 100 begins the deployment of the process software. An initial step is to determine if there are any programs that will reside on a server or servers when the process software is executed (101). If this is the case, then the servers that will contain the executables are identified (209). The process software for the server or servers is transferred directly to the servers' storage via FTP or some other protocol or by copying though the use of a shared file system (210). The process software is then installed on the servers (211).

Next, a determination is made on whether the process software is to be deployed by having users access the process software on a server or servers (102). If the users are to access the process software on servers, then the server addresses that will store the process software are identified (103).

A determination is made if a proxy server is to be built (200) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (201). The process software is sent to the (one or more) servers either via a protocol such as FTP, or it is copied directly from the source files to the server files via file sharing (202). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (203). Another embodiment is to have the servers automatically copy the process software to each client and then run the installation program for the process software at each client computer. The user executes the program that installs the process software on his client computer (212) and then exits the process (108).

In step 104 a determination is made whether the process software is to be deployed by sending the process software to users via e-mail. The set of users where the process software will be deployed are identified together with the addresses of the user client computers (105). The process software is sent via e-mail to each of the users' client computers. The users then receive the e-mail (205) and then detach the process software from the e-mail to a directory on their client computers (206). The user executes the program that installs the process software on his client computer (212) and then exits the process (108).

Lastly, a determination is made on whether the process software will be sent directly to user directories on their client computers (106). If so, the user directories are identified (107). The process software is transferred directly to the user's client computer directory (207). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (208). The user executes the program that installs the process software on his client computer (212) and then exits the process (108).

Figure 3:
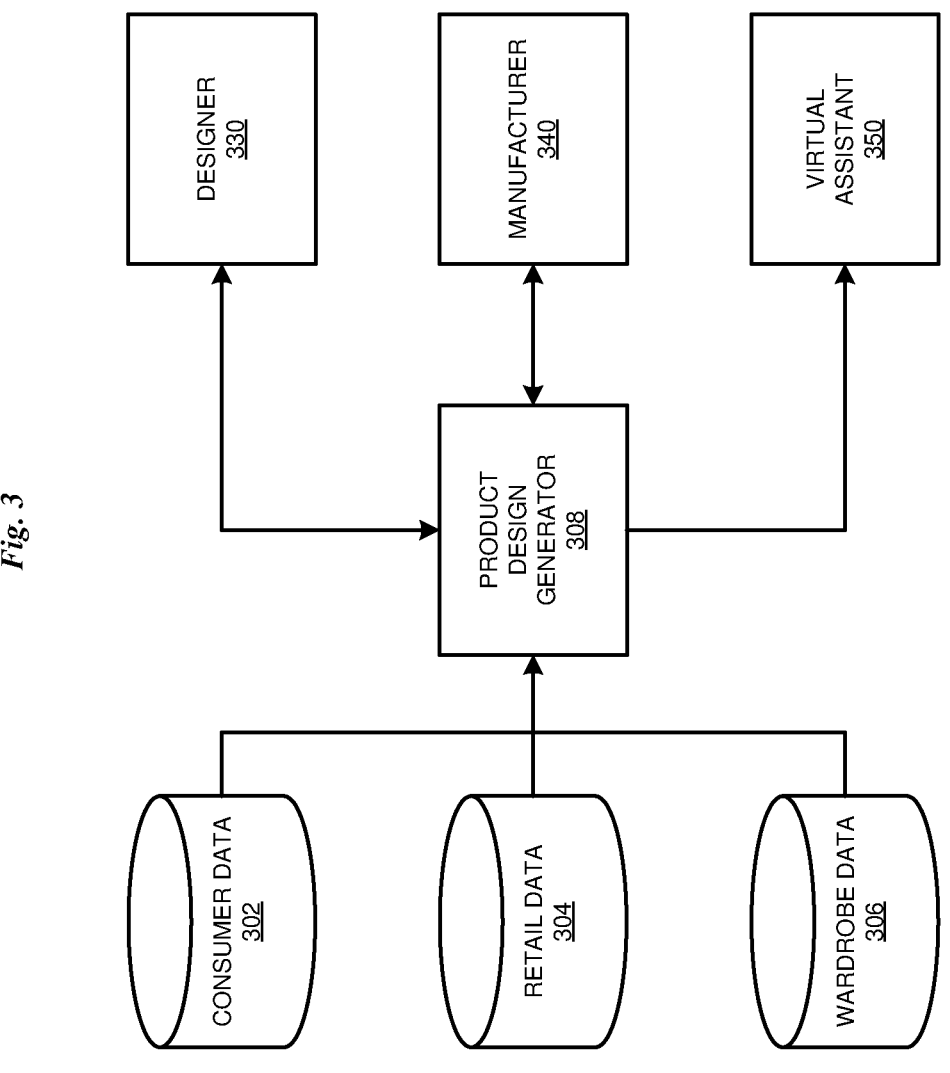
FIG. 3 depicts a block diagram of a system for collaborative product design generation in accordance with an illustrative embodiment.

With reference to FIG. 3, this figure depicts a block diagram of a system for a collaborative product design generation in accordance with an illustrative embodiment. In the illustrated embodiment, product design generator 308 includes the product design generator module 200 of FIG. 1

In the illustrated embodiment, the product design generator 308 may receive consumer data from a consumer database 302, retail data from retail database 304, and wardrobe data from the wardrobe database 306. Consumer data stored in the consumer database 302 may include any data that is related to the purchasers of particular products. Further, consumer database 302 may include consumer data from any particular region or location. It is contemplated herein that since the fashion industry may be localized or even hyper localized, consumer data from one region or location may be not reflective of consumer data from another region or location. Retail data stored in retail database 304 may include, but is not limited to, data related to retail metrics for products from a particular retailer. Although the term retailer is used for the sake of simplicity, it is contemplated herein that retail database 304 may include retail data for products associated with a particular brand, designer, manufacturer, etc., and term retailer is not intended to be interpreted in a limiting sense, but rather denotes an example entity associated with the sale of products. Further, retail data includes data that may be indicative of sales performance of products from a particular retailer, such as POS data. Wardrobe data stored in the wardrobe database 306 may include, but is not limited to, data related to the actual fashion products sold by a fashion retailer. In an embodiment, wardrobe database 306 is an image repository of images of fashion products sold by a retailer.

In the illustrated embodiment, product design generator 308 generates a new product design or designs based at least in part on the data received from consumer database 302, retail database 304, and/or wardrobe database 306, as described in greater detail herein. In an embodiment, product design generator 308 includes a Generative Adversarial Network (GAN) model trained and configured to generate a new product design based on pre-existing product designs. In an embodiment, the new product design is an image of new fashion product design. Further, in an embodiment, the new product design generated by the product design generator may be based at least in part on market data related to previous products, including the retailer's retail data as well as consumer data from a particular region or location.

Further, in the illustrative embodiment, the product design generator 308 may receive feedback from a designer 330 and/or a manufacturer 340. For example, the product design generator 308 may generate a new product design that a designer 330 may not approve of, in which case, the designer may reject so that the product design generator 308 is less likely to generate a similar design to the rejected design in the future. On the other hand, the designer 330 may approve of the design, in which case the product design generator 308 will be more likely to generate similar designs in the future. As another example, a manufacture 340 may reject a product design generated by the product design generator 308. Suppose a new product design is generated that would be impractical or too expensive to manufacture, in which case, the manufacturer may reject the new product design so that the product design generator 308 is less likely to produce similar product design in the future. It is contemplated herein that the product design generator may receive feedback from other sources, although not explicitly depicted in FIG. 3. As a nonlimiting example contemplated herein, feedback may also be crowdsourced directly from consumers for a new product design generated by product design generator 308.

Further, in the illustrative embodiment, product design generator 308 may be configured and/or integrated with a virtual assistant 350. The virtual assistant 350 is a software application designed to provide assistance and perform tasks for an individual or business. Further, the virtual assistant may be accessed through a device such as a smartphone, tablet, and/or computer. The virtual assistant 350 may be configured to provide a response upon receiving an input command. Accordingly, a user may enter a query via an interface of the virtual assistant 350, and the virtual assistant 350 may in return provide a response. Suppose a retailer instructs the virtual assistant 350 to provide a new product design, then the virtual 350 may in response generate an image of a new product design.

Figure 4:
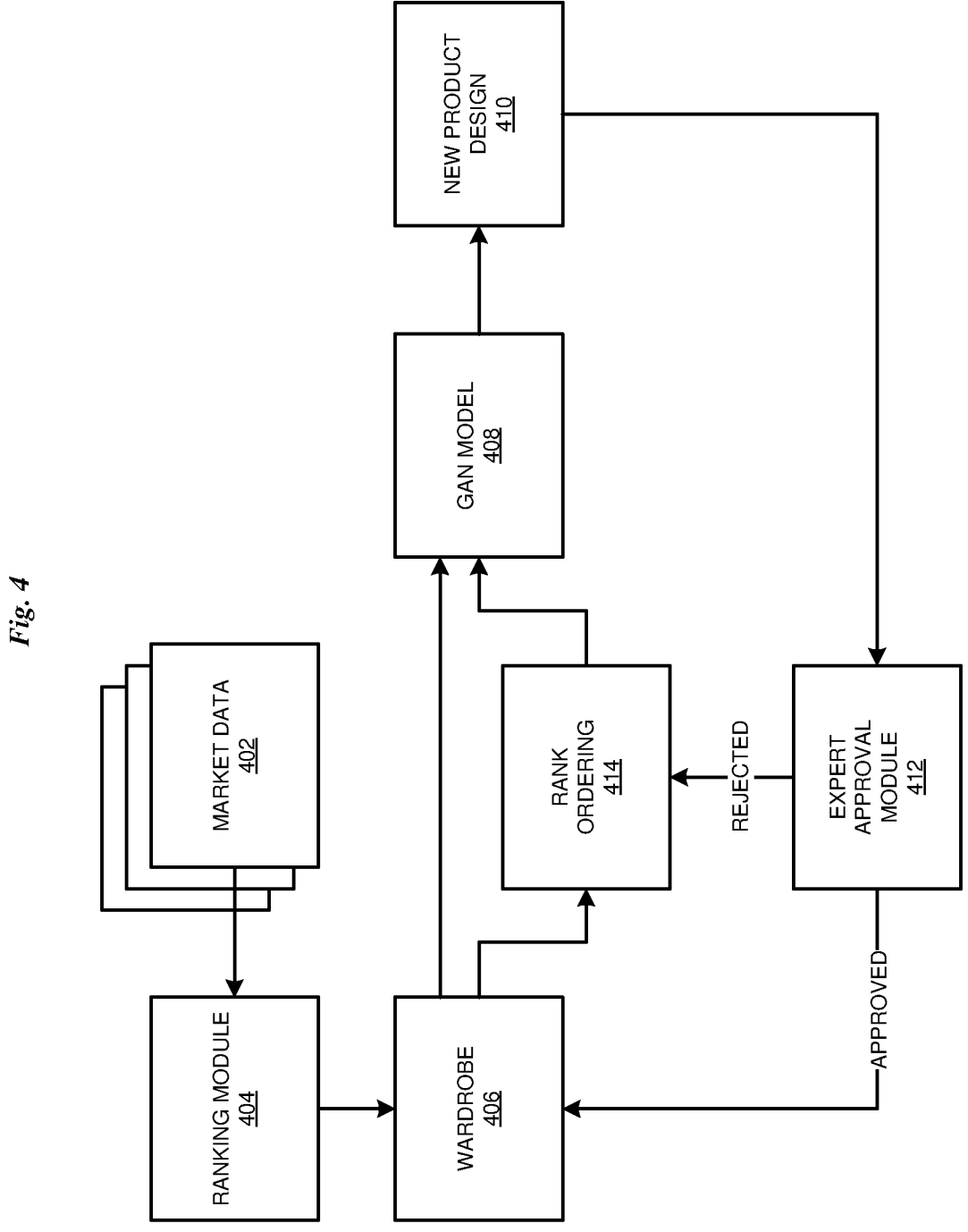
FIG. 4 depicts a block diagram of an abstracted model architecture for configuring an example product design generator in accordance with an illustrative embodiment.

With reference to FIG. 4, this figure depicts a block diagram of an abstracted model architecture for configuring an example product design generator in accordance with an illustrative embodiment.

In the illustrative embodiment, market data 402 is received by a ranking module 404. Market data 404 may include any data related to fashion trends, market demand for fashion products, market sentiment towards fashion products, etc., as described in greater detail herein. Ranking module 404 is configured to determine a ranking of features and attributes of fashion products based on market data 402 relating to said fashion products. In an embodiment, ranking module 404 may determine feature vectors for fashion products based on market data and may determine a ranking of feature vectors for said fashion products. Further, the ranking module 404 may be applied to the wardrobe 406 to determine a rank ordering 414 for fashion products within the wardrobe 406. Further, the GAN model 408 may generate a new product design based on wardrobe 406 and the rank ordering 414 of the wardrobe 406. Further, the new product design 410 may be received by the expert approval module 412, and, upon receiving the new product design 410, the expert approval module 412 determines whether to approve or reject the new product design 410. Accordingly, if the new product design 410 is approved, then the new product design may be added to the wardrobe 406. However, if the new product design 410 is rejected, then the rank ordering 414 of the items in the wardrobe 406 items is adjusted. In an embodiment, the depicted operations are performed iteratively. In an embodiment, iterations of the operations are performed until convergence is achieved. Accordingly, convergence may be achieved when it is determined that iterations are no longer necessary and/or provide negligible improvement to the system. In an embodiment, convergence is achieved upon meeting a predetermined convergence criteria. In an embodiment, the convergence criteria may be meeting a predetermined acceptance threshold, wherein the predetermined acceptance threshold is a threshold of accepted product designs. As a nonlimiting example, the predetermined acceptance threshold may a 95% approval rate, meaning that 95% of the product designs generated by GAN model in a given training session are approved by the expert approval module 412.

Figure 5:
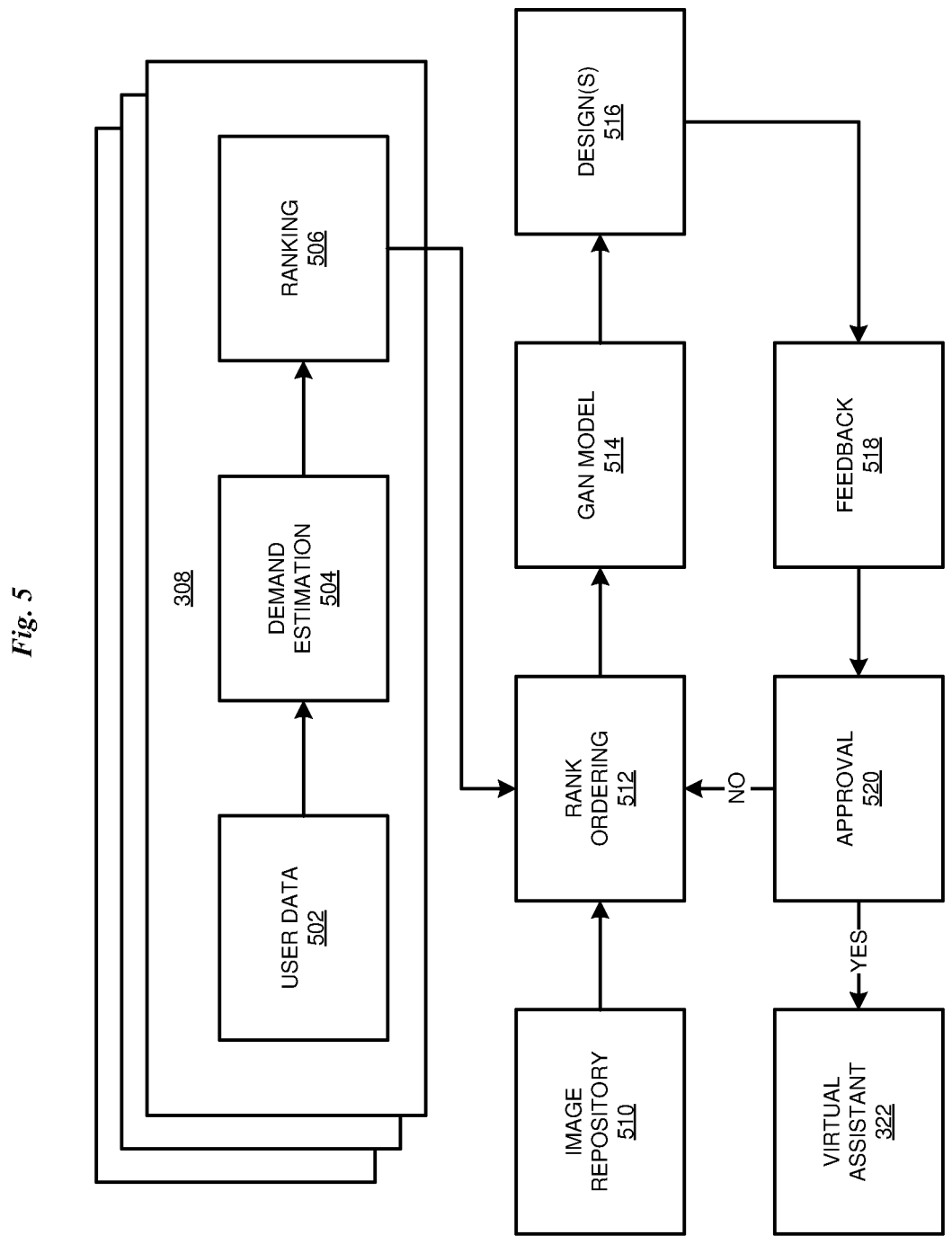
FIG. 5 depicts a block diagram of an abstracted model architecture for configuring an example product design generator in accordance with an illustrative embodiment.

With reference to FIG. 5, this figure depicts a block diagram of an abstracted model architecture for configuring an example product design generator in accordance with an illustrative embodiment. In the illustrated embodiment, user data 502 may be used to determine the demand estimation 504. The demand estimation may be used to determine a ranking 506. The ranking 506 may be utilized to determine the rank ordering 512 for images of products within the image repository 510.

The rank ordering 512 may be utilized by the GAN model 514 to generate a new product design 516. Feedback 518 for the new design generated by the GAN model 514 is provided by a designer and/or manufacturer. Block 520 represents possible approval by the designer/manufacturer. If the design 516 is approved, then the design 516 may be transmitted to a virtual assistant 522. If the design 516 is not approved, then the design rank ordering 312 is updated to reflect that that a particular design was not approved, thereby influencing future iteration of design(s) 516 generated by the GAN model 514 to be less likely to be similar to the new design 516 that was produced in the present iteration.

In the illustrated embodiment, ranking resources 508 represent a plurality of different resources that may be utilized to determine a ranking 506 of a plurality of products. The plurality of ranking resources 508 may include, but is not limited to, browser data, point-of-sale (POS) data, and/or social network data. Browser data includes data related to internet activity, including, but not limited to, search history and websites visited. In an embodiment, a user provides authorization to collect that user's browser data, and upon receiving authorization to collect that user's browsing data, that user's browser data is collected and used in part to evaluate a demand estimation 504 for products. Accordingly, browser data, such as browsing history data, may provide in-depth information related to a consumer's current search preferences, and also personal biases. It is contemplated that a collective analysis of browsing data may provide detailed insights to market trends more accurately. It is contemplated in the present disclosure herein that browsing data is relevant for e-commerce business, at least because there exists a large bias between in-stores sales from online ecommerce sales. POS data includes direct sales data, and may be appropriate for choice models, since sales are often guided by available product assortment. It is contemplated in the present disclosure herein that POS data can be linked to a product catalogue, and may enable a detailed product part-worth analysis.

Further, each data source of the plurality ranking resources 508 enables a metric specific evaluation for each product of a plurality of products. For example, browsing data may enable the determination of metrics that include, but are not limited to, a most visited product page, a product with the high sales-to-browse ratio, etc. POS data may enable the determination of metrics that include, but are not limited to, a high selling product, a fastest selling product, etc. Further, POS data may enable latent demand estimation using a choice model that may be used to predict a choice of a product from a set of two or more products. Further, social network data may enable sentiment metric evaluation. In an embodiment, the sentiment metric is a scaled scalar metric.

In an embodiment, each product of a plurality of products may be represented by product feature vectors. Product features may include, but are not limited to, a list of product attributes, a product description vector embedding derived using a natural language processing (NLP) model, and/or an image similarity-based vector embedding Further, a machine learning algorithm may be utilized to generate a feature-to-metric map, which is a mapping relating specific features to specific metrics. The machine learning algorithm, e.g., product ranking algorithm, may utilize product features as input and apply a trained model to estimate a metric to determine a relative product ranking.

Figure 6:
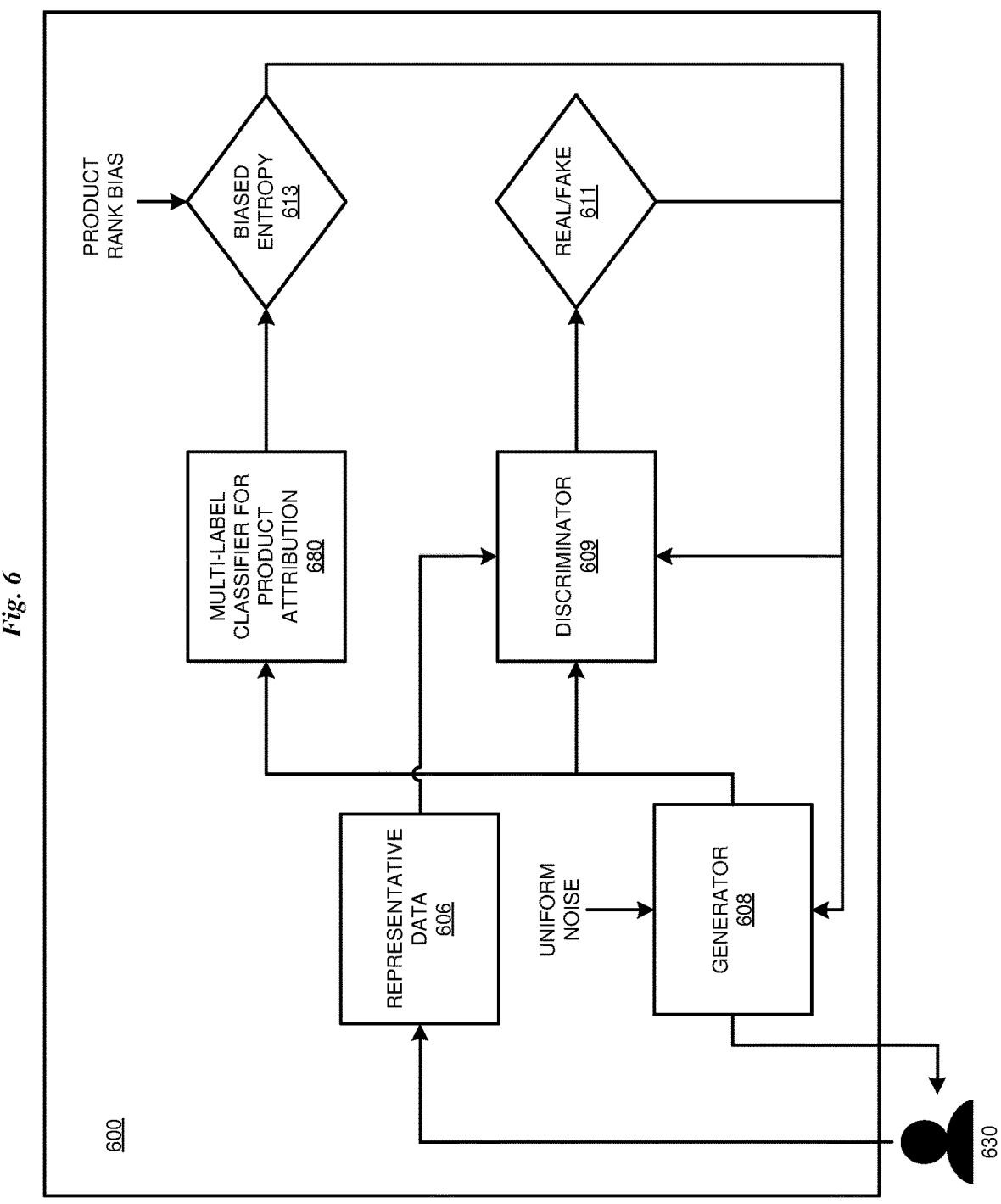
FIG. 6 depicts a block diagram of an abstracted model architecture for training machine learning model to generate new product designs in accordance with an illustrative embodiment.

With reference to FIG. 6, this figure depicts a block diagram of an abstracted model architecture for training a machine learning model to generate new product designs in accordance with an illustrative embodiment. In an embodiment, the machine learning model includes Generative Adversarial Network (GAN). In the illustrated embodiment, the GAN includes the generator network module 608 and the discriminator network module 609.

A novel feature of the model 600 includes the utilization of an external biased entropy loss function for introducing class bias by product ranking. Another novel feature of model 600 includes an interactive update policy which causes the representative data for training the GAN to be updated with each iteration. In an embodiment, in each iteration of the operations performed by model 600, the representative data 602 is partially updated in accordance with the feedback of the designer 630. Further, in an embodiment, the product ranking bias is updated in accordance with the feedback of the designer 630. The model 600 may achieve convergence via an guided convergence approach, meaning that the feedback of the designer 630 is utilized to achieve convergence. It is contemplated that utilization of feedback from the designer 630 may guarantee convergence is achieved through training the model 600.

In an embodiment, the process for training the model as depicted by FIG. 6 includes a three-step cycle. The first step includes updating the representative data 606 for GAN training. The second step includes updating the generator utilizing new representative data. The third step includes expert intervention (such as selecting and/or approving a design) from the generator data. While the process for training the GAN is depicted as a three-step cyclical process, it is contemplated that fewer or more steps may likewise be included.

With reference to FIG. 6, representative data 606 depicts training dataset used to train the GAN. In an embodiment, representative data 606 includes wardrobe data 306 depicted by FIG. 3. In the illustrated embodiment, representative data 606 includes image vectors embeddings representative of images of products that exist in a retailer's wardrobe.

In an embodiment, updating the representative data 606 may be accomplished in the following exemplary manner. Each product from a designer wardrobe may be ranked by a ranking system. In an embodiment, the ranking system orders each product by a specific market metric. Further, in an embodiment, each of the product classes may be balanced in an inverse rank proportion, using the bias term in the classification. In said embodiment, a low rank corresponds over representation of a product in the generated image space. Accordingly, balancing each of the product classes may be performed to correct sampling bias. Further, in the illustrated embodiment, the model 600 includes a biased entropy loss module 613. The biased entropy loss module is configured to introduce class bias by product ranking.

Further, generator network 608 depicts a generator network configured to generate images of new product designs. In the illustrated embodiment, the generator 608 creates synthetic data samples, e.g., images of new fashion product designs, by learning the underlying patterns and structures from the representative data 606. In the illustrated embodiment, the generator 608 takes random noise as input and outputs images of new product designs that are intended to be similar to the images of products within the representative data 606. Further, in the illustrated embodiment, discriminator 609 represents a discriminator network 609 configured to distinguish between real and fake data samples. The discriminator 609 receives real data samples from the representative data 606 and synthetic data samples from the generator 608 to classify the synthetic data as either real or fake via the binary classifier 611. The discriminator 609 is trained to be able to distinguish between real and fake data samples while the generator 608 is trained to create fake data samples that are ultimately indistinguishable from the real data samples in the representative data 606. The generator 608 and the discriminator compete against each other until the generator 608 produces images of new product designs that the discriminator can not distinguish from the existing products design within the representative data 606.

In an embodiment, product designs generated by the generator 608 may be evaluated by a designer 630 until predetermined acceptance threshold is met. In a scenario where the rate of rejected product designs is higher than an allowable value, the product design may be merged to the last selected product profile. The steps of ranking each product and balancing classes associated with each product may be performed iteratively until an exist criteria is met. In an embodiment, the exist criteria includes an acceptance rate that meets a predetermined threshold acceptance rate.

Further, in the illustrated embodiment, the multi-label classifier for product attribution 680 depicts a neural network trained to classify new product designs generated by the generator 608. In an embodiment, the multi-label classifier 680 is trained separately to be able to classify different attributes of a given product. For example, the multi-label classifier 680 may receive an image of a product as input, and output different attributes of that product. The multi-label classifier 680 may assign any number of labels that correspond to product attributes for a given image of a product. Examples of attributes for a fashion product may include, but are not limited, the type of garment, the type of material, the existence of adornments, e.g., buttons, zippers, the a type of pattern, e.g., dots, stripes, etc., and any other attributes that may be associated with a given fashion product. Accordingly, as a nonlimiting example, the classifier may receive an image of a shirt, and the classifier may classify that image according to a plurality of attributes, such as that the image is a shirt, the image includes buttons, the image contains certain designs, etc.

In an embodiment, the GAN is trained via an incremental GAN network training approach. An advantage of the incremental GAN network training approach is that subsequent model training iteration during designer/expert interaction does not require large computer resources. Accordingly, the incremental GAN network training approach provides a significant improvement to the functioning of the underlying computer technology by reducing the drain on computer resources used to train the model.

Figure 7:
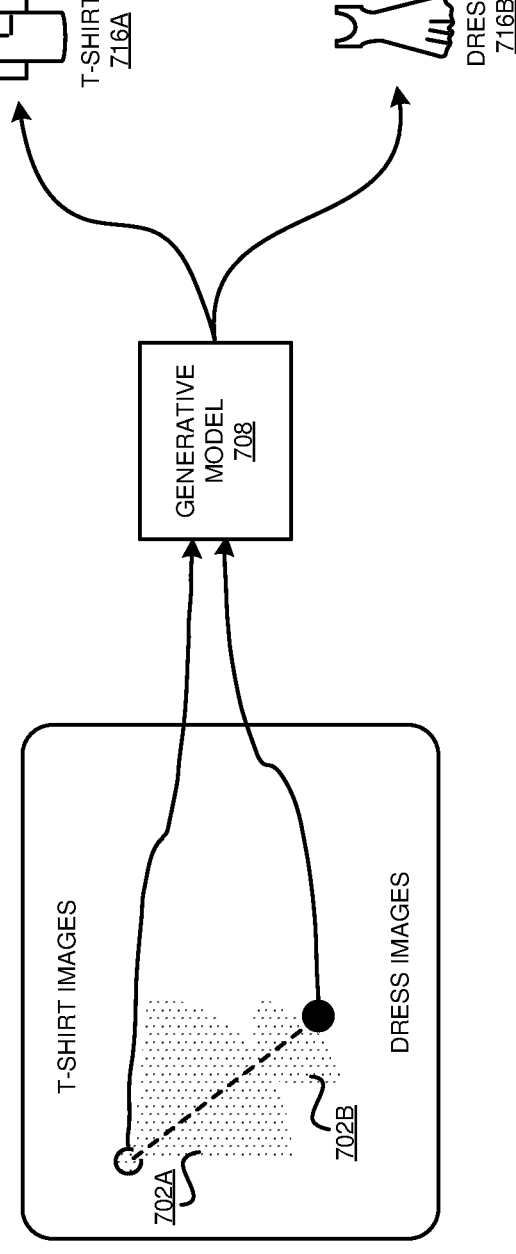
FIG. 7 depicts a diagram of an influence radius in accordance with an illustrative embodiment.

With reference to FIG. 7, this figure depicts a diagram of an influence radius in accordance with an illustrative embodiment. The influence radius is a term given to the volume of the part of sampling space where random sampling results in yielding images of the same class. Influence radius is the volume of the part of sampling space where random sampling results in yielding images that are of same design type. The size of the influence radius for any specific type can be controlled by adding a biased entropy loss function ($\Sigma p_i v_i \ln(p_i)$) to the GAN training.

With continued reference to FIG. 7, an example scenario is depicted where the influence radius 702a for t-shirt images is greater than the influence radius for dress images. In the illustrated embodiment, t-shirt image 716a and dress image 716b are each an example embodiment of a new product design as depicted by new product design 410 of FIG. 4 and design 516 of FIG. 5. In accordance with the example scenario depicted, the generative model 708 would be expected to generate an image of a t-shirt 716a at a higher frequency than an image of a dress 716a.

Suppose a scenario in which a sampling space includes 100 total images, and of those 100 images, the sampling space includes 75 t-shirt images and 25 dress images. In said scenario, a random sampling of the sampling space may be expected to result in generating an image of a t-shirt 75 out of 100 times, and an image of a dress 25 out of 100 times. An embodiment includes adjusting the influence radius for each class of images, which thereby enables control over the relative frequency of the class of image generated by the GAN model. Accordingly, by controlling influence radius for each class, the relative frequency of the class in the randomly generated images by the GAN model may be controlled. In an embodiment, the size of the influence radius for any class may be controlled by including a biased entropy loss function to the GAN training.

Further, the GAN module may contain an additional classifier module, as described herein. In an embodiment, the classifier module may be trained separately on the wardrobe dataset for attribute marking. Further, the product ranking may be associated with the product attributes. The product term is computed using the product attribute space. It is contemplated herein that uniform sampling of the GAN input, combined with a biased entropy function applied on each batch, may guarantee biased representation of a product or products within output images generated by the GAN. Accordingly, the the influence radius in the input data for each specific design type may be used to control the relative frequency of that design type in the randomly generated images by the GAN model.

Figure 8:
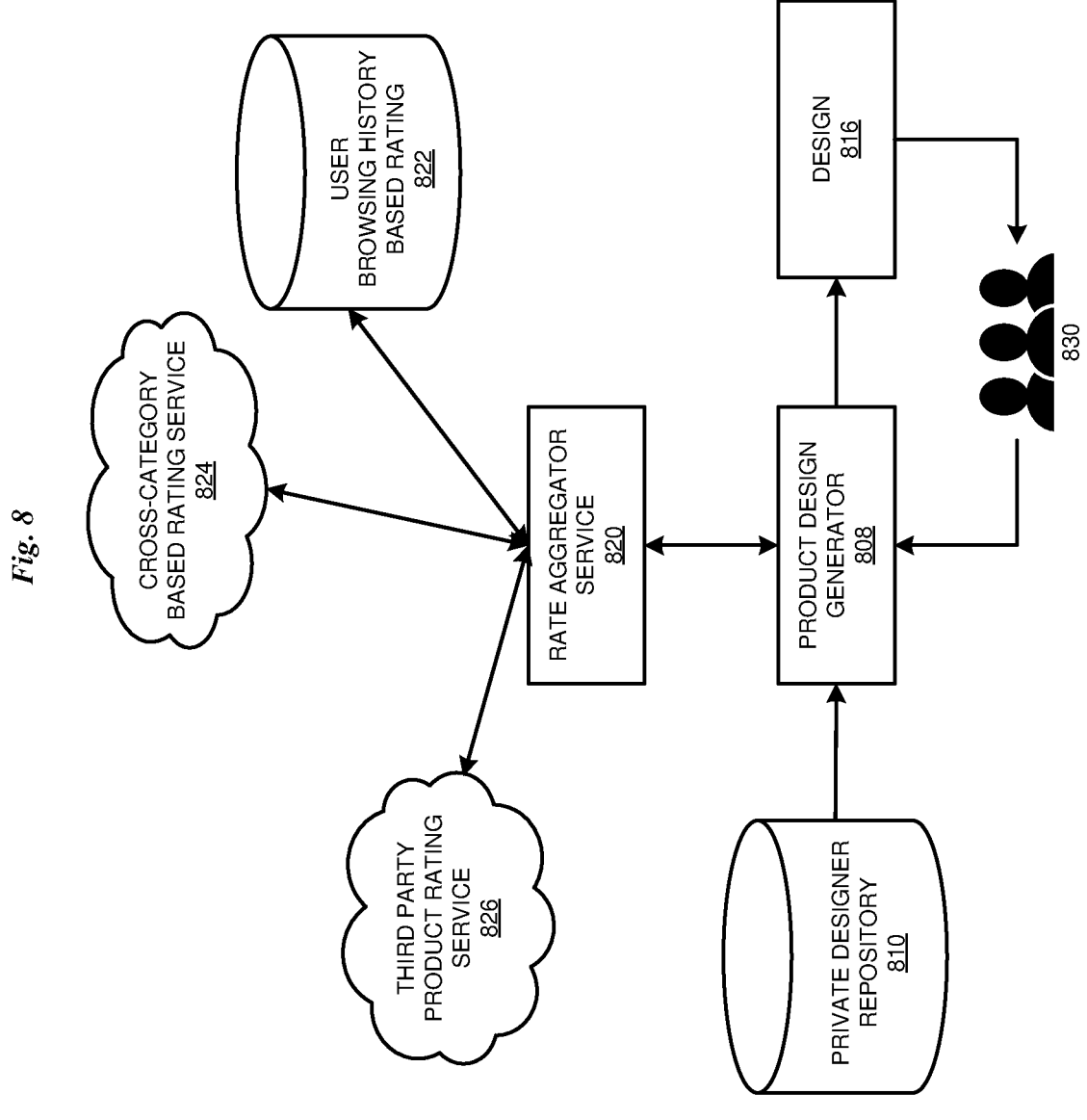
FIG. 8, this figure depicts a block diagram of an example cloud-based processing environment for a cloud-specific deployment of a product design generator.

With reference to FIG. 8, this figure depicts a block diagram of an example cloud-based processing environment for a cloud-specific deployment of a product design generator model 808. In the illustrative embodiment, product design generator model 808 includes product design generator module 200 of FIG. 1 and/or product design generator 308 of FIG. 3 Private design repository 810 is an example wardrobe database 306 of FIG. 3.

In the illustrated embodiment the product design generator model 808 is shown integrated with one or more external services that may provide market metrics and/or product ranking. The source and/or method of product ranking is not intended as limiting aspect of the present disclosure. Further, the cloud deployed embodiment depicted enables the product design generator 808 to share product ranking while preserving privacy of private data, including undisclosed product designs stored in private design repository 810.

Further, it is contemplated herein that the cloud deployment embodiment depicted also enables a new product style launch use-case. For example, a designer brand from Country A may be interested in launching a new product in Country B, and likewise the designer brand may desire to adapt the new product to the market of Country B. A designer brand may obtain product ranking from a product design generation model of Country B to adapt the designer brand's product to Country B. The cloud deployment embodiment may utilize a separate communication channel for communicating market metrics and a separate communication channel for a private design repository 810, thereby not sharing private information across any channel. In a cloud deployment embodiment, horizontal collaborative training of a product generator model is enabled without disclosing private design repositories between different brands.

In the illustrative embodiment, the product design generator 808 is configured to generate a new product design 816. The product design generator receives image data from private design repository 810 as well as a product ranking from the rate aggregator service 820. The rate aggregator service 820 may receive product ranking data from a third-party product rating service 826, cross-category based product ranking data from cross-category based rating service 824, and user ranking data from user browsing history database 822, to form an aggregate product ranking. Further, the rate aggregator service 820 may receive ranking data from the product design generator 808.

Figure 9:
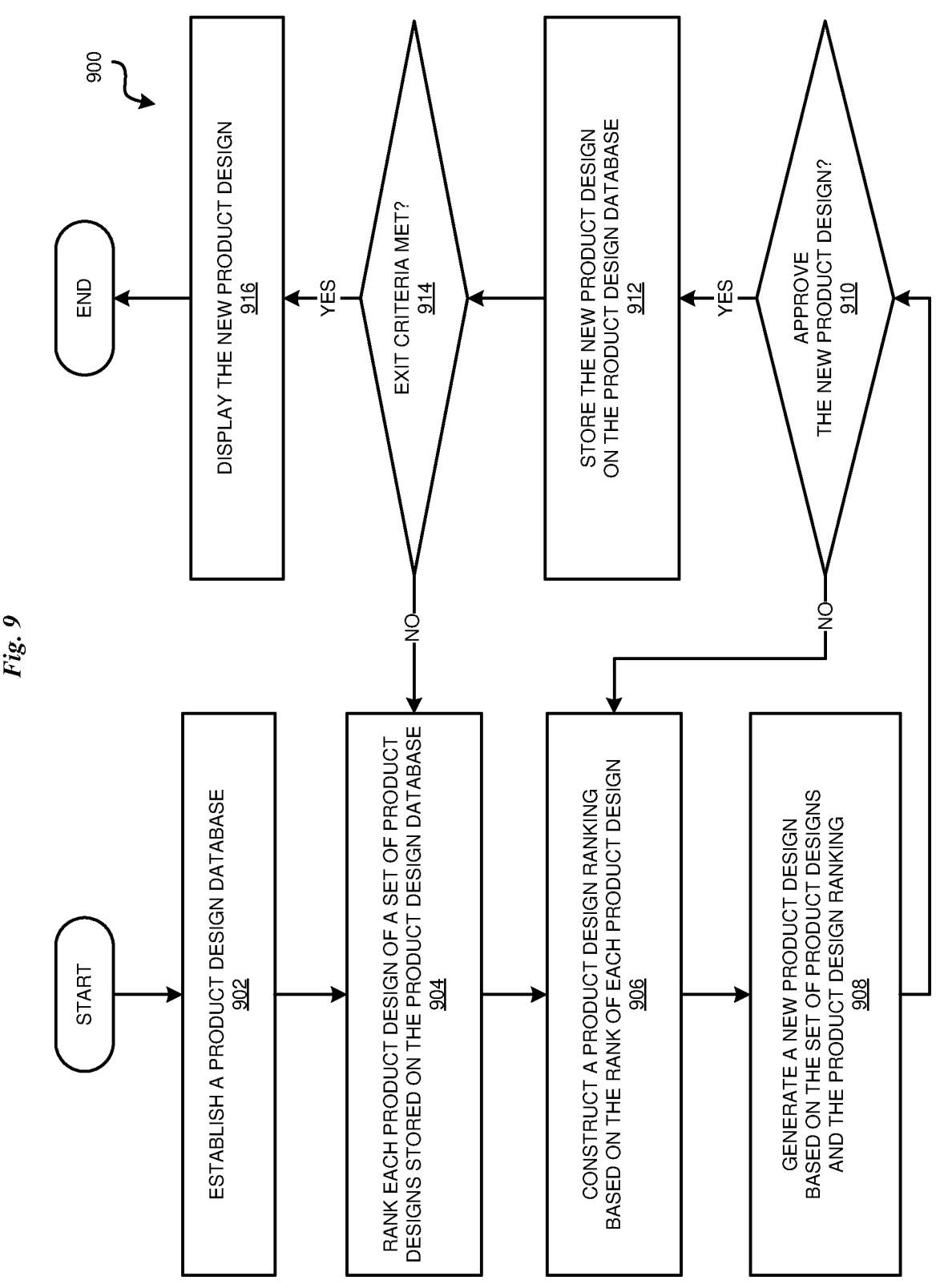
FIG. 9 depicts a flowchart of an example process for product design generation in accordance with an illustrative embodiment.

With reference to FIG. 9, this figure depicts a flowchart of an example process 900 for generating a new product design in accordance with an illustrative embodiment. In a particular embodiment, the product design generator module 200 of FIG. 1 carries out the process 900.

In the illustrated embodiment, at block 902, the process establishes a product design database. Accordingly, the product design database may include product design data related to product designs. As a nonlimiting example contemplated herein, the product design data may include product designs from a wardrobe of a particular designer or retailer. In an embodiment, the product design data may include images, models, CADs, etc. of different product designs.

At block 904, the process ranks each product design of a plurality of product designs stored on the product design database based on a ranking metric derived from a market data source. In an embodiment, the process determines pre-existing products that exhibit high market demand and/or favorable market sentiment. Further, in said embodiment, the process determines characteristics of those products that contribute to high market demand and/or favorable market sentiment. Accordingly, a ranking metric may be formed based on or more characteristics that contribute to high market demand and/or favorable market sentiment. In an embodiment, the ranking metric may be determined based in part from market data associated with one or more products that exhibit one or more characteristics associated with high market demand and/or favorable market sentiment. In some embodiments, a source of market data may include, but is not limited to, browsing data, social network data, and/or point-of-sale (POS) data.

At block 906, the process constructs a product design ranking for the plurality of product designs based on a relative rank of each of the plurality of product designs. Accordingly, each of the plurality of product designs is ranked based on the market metric based that is part on the existence of characteristics that contribute to high market demand and/or favorable market sentiment. Once each product design is ranked, a ranking for the plurality of product designs is determined.

At block 908, the process generates a new product design based in part on the set of product designs and the product design ranking using a machine learning model. In some embodiments, the machine learning model is a GAN. Accordingly, a characteristic of one or more of the plurality of product designs that is associated with high market demand and/or favorable market sentiment is more likely to be present in the new product design than a characteristic associated with low market demand and/or unfavorable market sentiment.

At block 910, the process determines whether the new product design is approved. In some embodiments, the process evaluates whether the new product design satisfies a particular design constraint, and the new product design is approved upon satisfying the particular design constraint. A design constraint may include any limitation imposed on a new product design. For example, it may be the case that a particular designer is not interested in new product designs that exhibit a certain characteristic or design element, such as, for example, the existence of a type of pattern. Also, the design constraint may be based on much more subtle visual cues, and/or the subjective judgment of a designer. The design constraint may be determined by an evaluator, wherein the evaluator may also determine whether the particular design constraint has been satisfied. In said embodiments, the evaluator is at least one of a designer, manufacturer, and/or any suitable person that may evaluate the design to determine whether the new product design is acceptable. If the process determines the new product design is accepted, then the process proceeds to block 912. Else, if the process determines the new product design is rejected, then the process updates the product design ranking to reflect that the new product design is not desired.

At block 912, upon a determination that the new product design is accepted, the process stores the new product design in the product design database. At block 914, the process determines whether an exit criterion has been met. Accordingly, the process may be repeated until the model's performance improves based on a given criteria, and/or a predetermined exit criteria is met. Further, the step of ranking each product may be performed iteratively until an exist criteria is met. In an embodiment, the exist criteria includes an acceptance rate that meets a predetermined threshold acceptance rate. As a nonlimiting example, the predetermined acceptance threshold may be a 95% approval rate, meaning that 95% of the product designs generated by the model in a given training session are approved. If the exit criterion has not been met, the process may proceed to block 904. If the exit criterion has been met, then the process may proceed to block 916. At block 916, the new product design is displayed via an interface. In some embodiments, the new product design is displayed via an interface of a virtual assistant.

In some embodiments, the process also includes actuating a manufacturing system to manufacture a product or a product part according to the new product design. Accordingly, the manufacturing system may include a machine or machines configured to perform operations including, but not limited to, dying a piece of material, cutting a piece of material, adhering (e.g., sewing) two or more pieces of material together, attaching buttons, zippers, snaps, appliques, etc. to a piece of material, and/or any combination thereof.

In some embodiments, the process also includes actuating an additive manufacturing system produce a product or product part according to the new product design. In some said embodiments, the manufacturing system includes a 3D printer. Accordingly, in some said embodiments, the additive manufacturing system, e.g., 3D printer is configured print to a full size or scaled version of a product or product part according to the new product design.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

establishing a product design database based at least in part on product design data received from a product image repository, wherein the product design data is representative of a plurality of product designs;

transforming each product design into a vector embedding representing the product design, the transforming producing a set of vector embeddings;

ranking each product design of the plurality of product designs stored on the product design database based on a ranking metric derived from market data corresponding to existing retail products;

constructing a product design ranking based on a relative ranking between each of the product designs that have been ranked;

generating a new product design using a machine learning model based on the plurality of product designs and the product design ranking;

adjusting an influence radius for a class of images generated by the machine learning model to control a frequency of the class of images generated, the adjusting the influence radius causing the machine learning model to generate new product design images according to the influence radius of the class of images;

updating, upon an evaluation that the new product design satisfies a design constraint, the set of vector embeddings, wherein the updating is performed iteratively, wherein each iteration comprises updating the set of vector embeddings based on design features corresponding to the new product design;

displaying one or more new product designs of the set of new product designs via an interface; and actuating, upon an evaluation that the set of new product designs satisfies an acceptance threshold, a manufacturing system to manufacture at least one of a product or product part according to the one or more new product designs.

2. The computer-implemented method of claim 1, further comprising training the machine learning model by iteratively evaluating whether the new product design satisfies the design constraint, wherein a new product design that satisfies the design constraint during a first iteration is used as input for a subsequent iteration, and wherein training the machine learning model ceases upon meeting an exit criterion.

3. The computer-implemented method of claim 2, wherein meeting the exit criterion comprises meeting a predetermined acceptable design threshold.

4. The computer-implemented method of claim 2, wherein training the machine learning model is performed incrementally.

5. The computer-implemented method of claim 2, wherein training the machine learning model comprises a reinforcement learning with human feedback (RLHF) technique.

6. The computer-implemented method of claim 2, wherein training the machine learning model further comprises applying a biased entropy loss function to bias the product design ranking.

7. The computer-implemented method of claim 1, wherein the market metric is based in part on market demand.

8. The computer-implemented method of claim 1, wherein the market metric is based in part on market sentiment.

9. The computer-implemented method of claim 1, wherein the market data comprises at least one of browsing data, social network data, and point-of-sale (POS) data.

10. The computer-implemented method of claim 1, wherein machine learning model comprises a generative adversarial neural network.

11. A computer program product for new product design generation comprising one or more computer readable storage media, and program instructions collectively stored on the one or more computer readable storage media, the program instructions executable by a processor to cause the processor to perform operations comprising:

establishing a product design database based at least in part on product design data received from a product image repository, wherein the product design data is representative of a plurality of product designs;

transforming each product design into a vector embedding representing the product design, the transforming producing a set of vector embeddings;

ranking each product design of the plurality of product designs stored on the product design database based on a ranking metric derived from market data corresponding to existing retail products;

constructing a product design ranking based on a relative ranking between each of the product designs that have been ranked;

generating a new product design using a machine learning model based on the plurality of product designs and the product design ranking;

adjusting an influence radius for a class of images generated by the machine learning model to control a frequency of the class of images generated, the adjusting the influence radius causing the machine learning model to generate new product design images according to the influence radius of the class of images;

updating, upon an evaluation that the new product design satisfies a design constraint, the set of vector embeddings, wherein the updating is performed iteratively, wherein each iteration comprises updating the set of vector embeddings based on design features corresponding to the new product design;

displaying one or more new product designs of the set of new product designs via an interface; and actuating, upon an evaluation that the set of new product designs satisfies an acceptance threshold, a manufacturing system to manufacture at least one of a product or product part according to the one or more new product designs.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

14. The computer program product of claim 11, further comprising training the machine learning model by iteratively evaluating whether the new product design satisfies the design constraint, wherein a new product design that satisfies the design constraint during a first iteration is used as input for a subsequent iteration, and wherein training the machine learning model ceases upon meeting an exit criterion.

15. A computer system comprising a processor and one or more computer readable storage media, and program instructions collectively stored on the one or more computer readable storage media, the program instructions executable by the processor to cause the processor to perform operations comprising:

establishing a product design database based at least in part on product design data received from a product image repository, wherein the product design data is representative of a plurality of product designs;

transforming each product design into a vector embedding representing the product design, the transforming producing a set of vector embeddings;

ranking each product design of the plurality of product designs stored on the product design database based on a ranking metric derived from market data corresponding to existing retail products;

constructing a product design ranking based on a relative ranking between each of the product designs that have been ranked;

generating a new product design using a machine learning model based on the plurality of product designs and the product design ranking;

adjusting an influence radius for a class of images generated by the machine learning model to control a frequency of the class of images generated, the adjusting the influence radius causing the machine learning model to generate new product design images according to the influence radius of the class of images;

updating, upon an evaluation that the new product design satisfies a design constraint, the set of vector embeddings, wherein the updating is performed iteratively, wherein each iteration comprises updating the set of vector embeddings based on design features corresponding to the new product design;

displaying one or more new product designs of the set of new product designs via an interface; and actuating, upon an evaluation that the set of new product designs satisfies an acceptance threshold, a manufacturing system to manufacture at least one of a product or product part according to the one or more new product designs.

16. The computer system of claim 15, further comprising training the machine learning model based in part by iteratively evaluating whether a generated new product design is acceptable, wherein an acceptable generated new product design during a first iteration is used as input for a subsequent iteration, and wherein training the machine learning model ceases upon meeting an exit criterion.

17. The computer system of claim 16, wherein training the machine learning model further comprises applying a biased entropy loss function to bias the product design ranking.

* * * * *